United States Patent
Arai et al.

(10) Patent No.: US 11,188,015 B2
(45) Date of Patent: Nov. 30, 2021

(54) IMAGE RECORDING MEDIUM, METHOD OF PRODUCING IMAGE RECORDING MEDIUM, AND IMAGE FORMING APPARATUS

(71) Applicant: Ricoh Company, Ltd., Tokyo (JP)

(72) Inventors: Megumi Arai, Kanagawa (JP); Kohsuke Yoshida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/663,566

(22) Filed: Oct. 25, 2019

(65) Prior Publication Data
US 2020/0133178 A1    Apr. 30, 2020

(30) Foreign Application Priority Data

Oct. 30, 2018    (JP) .............................. JP2018-203911

(51) Int. Cl.
*B32B 3/00*    (2006.01)
*G03G 15/20*    (2006.01)
*G03G 15/00*    (2006.01)

(52) U.S. Cl.
CPC ..... *G03G 15/2053* (2013.01); *G03G 15/6588* (2013.01)

(58) Field of Classification Search
CPC . G03G 15/20; G03G 15/2053; G03G 15/6588
See application file for complete search history.

(56) References Cited

U.S. PATENT DOCUMENTS

| | | | |
|---|---|---|---|
| 5,126,797 | A | 6/1992 | Forest et al. |
| 5,327,201 | A | 7/1994 | Coleman et al. |
| 5,659,843 | A | 8/1997 | Takano et al. |
| 5,983,064 | A | 11/1999 | Green et al. |
| 6,360,065 | B1 | 3/2002 | Ishibashi et al. |
| 6,506,477 | B1 | 1/2003 | Ueda et al. |
| 6,519,428 | B1 | 2/2003 | Ohtoshi et al. |
| 2007/0164505 | A1 | 7/2007 | Ishibashi et al. |
| 2008/0008946 | A1 | 1/2008 | Iwasaki et al. |
| 2008/0019708 | A1 | 1/2008 | Sakamaki et al. |
| 2008/0025774 | A1 | 1/2008 | Ishibashi et al. |
| 2008/0102392 | A1 | 5/2008 | Koinuma et al. |
| 2008/0135160 | A1 | 6/2008 | Iwasaki et al. |
| 2008/0152407 | A1 | 6/2008 | Sudo et al. |
| 2008/0227019 | A1 | 9/2008 | Iwasaki et al. |

(Continued)

FOREIGN PATENT DOCUMENTS

| JP | 2000-015862 | * | 1/2000 |
|---|---|---|---|
| JP | 2007-206561 | | 8/2007 |
| JP | 2008-030457 | | 2/2008 |

OTHER PUBLICATIONS

Extended European Search Report dated Apr. 23, 2020 in Patent Application No. 19204736.3, 8 pages.

*Primary Examiner* — Elizabeth E Mulvaney
(74) *Attorney, Agent, or Firm* — Xsensus LLP

(57) ABSTRACT

An image recording medium includes two sheets made of resin and a toner image interposed between the two sheets. The toner image serves as an adhesive to bond the two sheets together and includes an information image. At least one of the two sheets includes a transparent portion to enable the information image to be visible through the at least one of the two sheets.

20 Claims, 7 Drawing Sheets

(56) References Cited

U.S. PATENT DOCUMENTS

| | | |
|---|---|---|
| 2008/0236736 A1 | 10/2008 | Nakamura et al. |
| 2010/0330495 A9 | 12/2010 | Nakamura et al. |
| 2015/0071692 A1 | 3/2015 | Maruta et al. |
| 2017/0131671 A1 | 5/2017 | Nishimura et al. |
| 2019/0212685 A1 | 7/2019 | Matsumoto et al. |

* cited by examiner

FIG. 6A
FIG. 6B
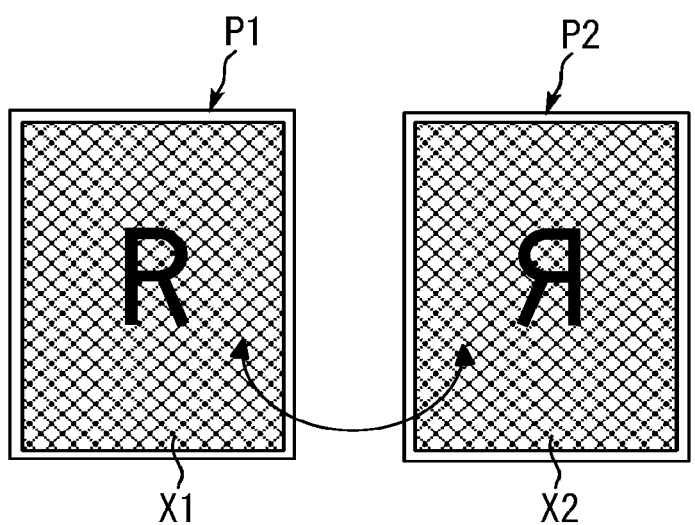
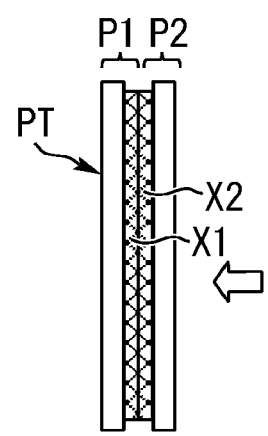

IMAGE RECORDING MEDIUM, METHOD OF PRODUCING IMAGE RECORDING MEDIUM, AND IMAGE FORMING APPARATUS

CROSS-REFERENCE TO RELATED APPLICATION

This patent application is based on and claims priority pursuant to 35 U.S.C. § 119(a) to Japanese Patent Application No. 2018-203911, filed on Oct. 30, 2018, in the Japan Patent Office, the entire disclosure of which is hereby incorporated by reference herein.

BACKGROUND

Technical Field

Embodiments of the present disclosure generally relate to an image recording medium produced by bonding two sheets, a method of producing the image recording medium, and an image forming apparatus.

Description of the Related Art

There is a technique to produce an image recording medium (recording medium) by bonding two sheets with toner serving as an adhesive using an image forming apparatus such as an electrophotographic color printer.

SUMMARY

Embodiments of the present disclosure describe an improved image recording medium that includes two sheets made of resin and a toner image interposed between the two sheets. The toner image serves as an adhesive to bond the two sheets together and includes an information image. At least one of the two sheets includes a transparent portion to enable the information image to be visible through the at least one of the two sheets.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6A is a schematic view of first and second transparent resin sheets as viewed from the front side according to Variation 1;

FIG. 6B is a side view of an image recording medium formed by bonding the first and second transparent resin sheets in FIG. 6A;

Figure 1:
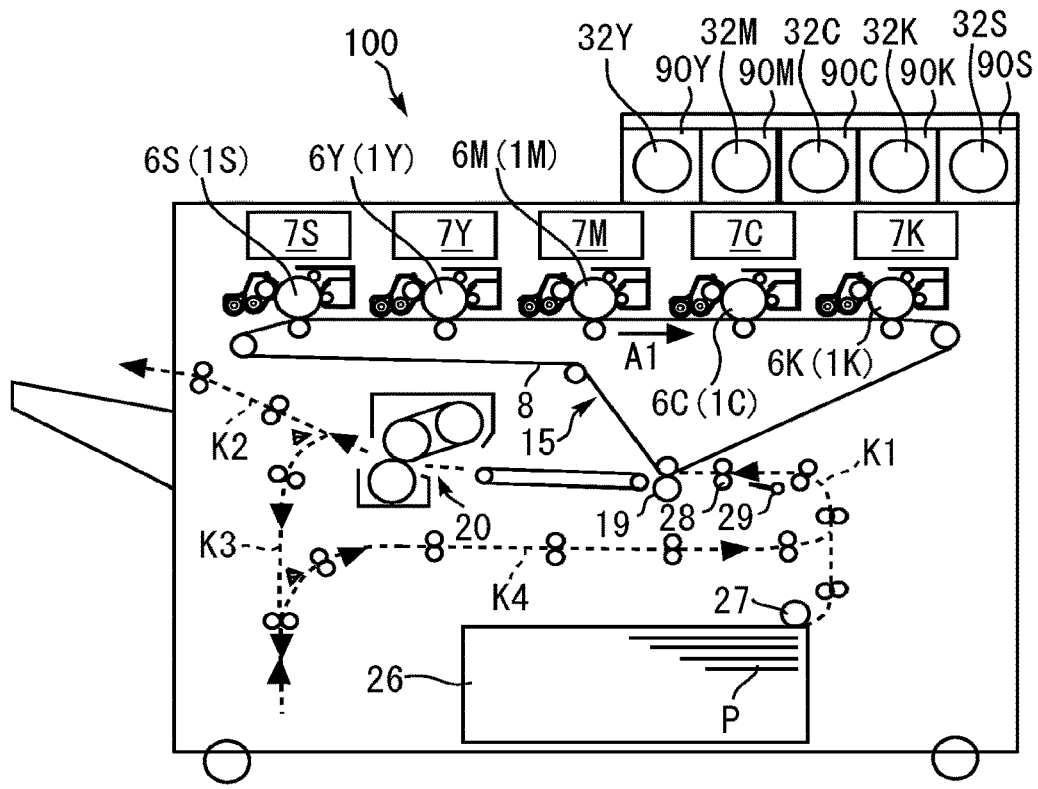
FIG. 1 is a schematic view illustrating a configuration of an image forming apparatus according to embodiments of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

Embodiments of the present disclosure are described in detail with reference to drawings. It is to be understood that identical or similar reference numerals are assigned to identical or corresponding components throughout the drawings, and redundant descriptions are omitted or simplified below as required.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a", "an", and "the" are intended to include the plural forms as well, unless the context clearly indicates otherwise.

It is to be noted that the suffixes Y, M, C, K, and S attached to each reference numeral indicate only that components indicated thereby are used for forming yellow, magenta, cyan, black, and special color images, respectively, and hereinafter may be omitted when color discrimination is not necessary.

Figure 2:
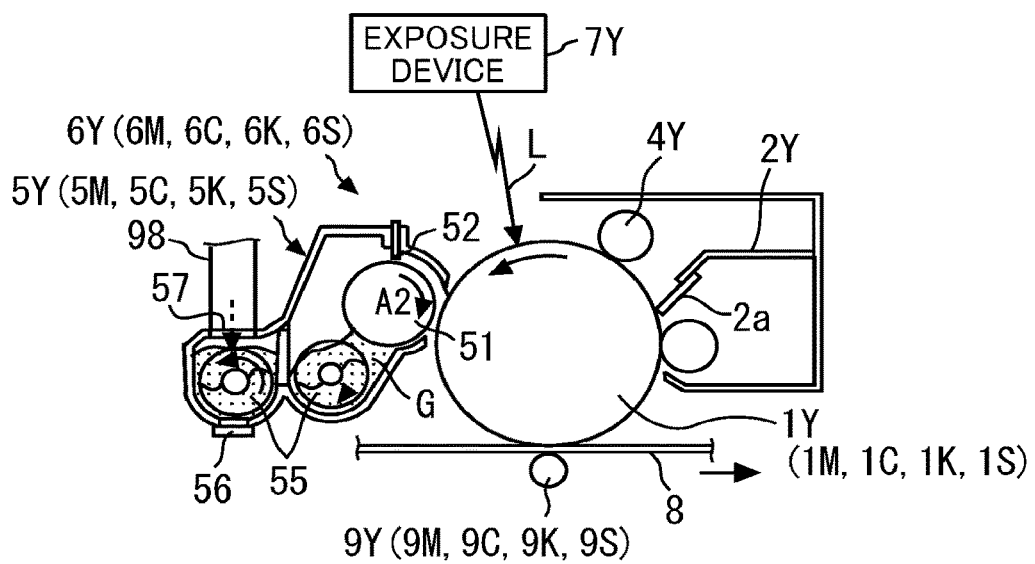
FIG. 2 is a cross-sectional view of a process cartridge and the vicinity thereof in the image forming apparatus illustrated in FIG. 1.

With reference to FIGS. 1 and 2, a configuration and operation of an image forming apparatus 100 is described below.

FIG. 1 is a schematic view illustrating a configuration of the image forming apparatus 100, which in the present embodiment is a printer, for example. FIG. 2 is an enlarged view of a process cartridge 6Y and the vicinity thereof in the image forming apparatus 100 illustrated in FIG. 1.

The image forming apparatus 100 according to the present embodiment is used to form an image on a sheet P such as plain paper, and also produces an image recording medium PT in which two sheets P1 and P2 that are overlaid and bonded. Hereinafter, the operation of the image forming apparatus 100 when an image is formed on a sheet P such as plain paper is mainly described below before descriptions of the image recording medium PT.

As illustrated in FIG. 1, toner supply devices 90Y, 90M, 90C, 90K, and 90S are arranged in parallel on one side of an upper portion of the image forming apparatus 100. Five toner containers 32Y, 32M, 32C, 32K, and 32S of different types are removably installed in the toner supply devices 90Y, 90M, 90C, 90K, and 90S, respectively. The toner containers 32Y, 32M, 32C, 32K and 32S are substantially cylindrical in the present embodiment. Specifically, as illustrated in FIG. 1, the toner containers 32Y, 32M, 32C (and the toner supply devices 90Y, 90M, and 90C) corresponding to three colors (yellow, magenta, and cyan) are disposed in order of yellow, magenta, and cyan from the left. The toner container 32K (and the toner supply device 90K) for black is disposed to the right of the toner container 32C for cyan, with a toner container 32S (and the toner supply device 90S) for special color disposed on the far right, to the right of the toner container 32K.

In particular, the toner container 32S for special color is often replaced with a toner container 32S for another type of special color depending on usage before all of the toner contained therein is consumed. Accordingly, the toner container 32S is replaced more frequently than the other toner containers 32Y, 32M, 32C, and 32K are, and for this reason, the toner container 32S is disposed farthest to the right to facilitate replacement.

With reference to FIGS. 1 and 2, the toner supply device 90K for black supplies black toner contained in the toner container 32K for black to the developing device 5K for black.

In addition, the three toner supply devices 90Y, 90M, and 90C for yellow, magenta, and cyan supply color toners of yellow, magenta, and cyan contained in the toner containers 32Y, 32M, and 32C for colors to the developing devices 5Y, 5M, and 5C for colors, respectively.

The toner supply device 90S for special color supplies a special color toner contained in the toner container 32S for special color to the developing device 5S for special color.

Any toner can be used as the black toner; the color toner of each of yellow, magenta, and cyan; or the special color toner.

In particular, the special color toner is different from the black toner and the color toners, and any white toner, clear toner (transparent toner, colorless toner, achromatic toner, no-pigment toner, or the like), gold toner, silver toner, or the like can be used as the special color toner depending on usage.

With reference to FIG. 1, five exposure devices 7Y, 7M, 7C, 7K, and 7S are disposed in an upper section of the image forming apparatus 100, and process cartridges 6Y, 6M, 6C, 6K, and 6S corresponding to yellow, magenta, cyan, black, and special color are arranged in parallel under the exposure devices 7Y, 7M, 7C, 7K, and 7S, facing an intermediate transfer unit 15 including an intermediate transfer belt 8.

As illustrated in FIG. 1, in the basic arrangement, the five process cartridges 6Y, 6M, 6C, 6K, and 6S are disposed in the order of the process cartridge 6S for special color, the process cartridge 6Y for yellow, the process cartridge 6M for magenta, the process cartridge 6C for cyan, and the process cartridge 6K for black from upstream in the direction of rotation of the intermediate transfer belt 8 (hereinafter, referred to as "rotation direction"). However, the arrangement order (arrangement) is appropriately varied depending on usage.

The special color toner is not limited to one type, and in many cases, different types of toner containers 32S for special colors are replaced depending on usage as appropriate. For example, the toner container 32S for clear toner may be replaced with the toner container 32S for white toner.

In such a case, depending on the type of the special color toner, preferably the process cartridge 6S for special color is moved from an extreme upstream installation position to an extreme downstream installation position in the rotation direction of the intermediate transfer belt 8. For example, the clear toner as the special color toner is often used for improving the glossiness of an image, and it is desirable that the clear toner be primarily transferred onto the intermediate transfer belt 8 first. Accordingly, as illustrated in FIG. 1, the process cartridge 6S for special color is disposed at the extreme upstream installation position in the rotation direction of the intermediate transfer belt 8. On the other hand, the white toner as the special color toner is often used for forming an image on a colored sheet P that is not white, and it is desirable that the white toner be secondarily transferred in the lowermost layer on the sheet P. Accordingly, the process cartridge 6S for special color is disposed at the extreme downstream installation position in the rotation direction of the intermediate transfer belt 8. With the rearrangement of the installation position of the process cartridge 6S for special color, the installation position of the process cartridge 6K for black is replaced with the installation position of the process cartridge 6S. Users or technicians manually perform the rearrangement operation according to procedures displayed on a control panel disposed on an exterior of the image forming apparatus 100.

With reference to FIG. 2, the process cartridge 6Y for yellow is a single unit removably installed in the image forming apparatus 100, includes the photoconductor drum 1Y, and further includes a charger 4Y, the developing device 5Y, and a cleaner 2Y disposed around the photoconductor drum 1Y. Image formation processes, namely, charging, exposure, development, transfer, and cleaning processes are performed on the photoconductor drum 1Y, and thus a yellow toner image is formed on the photoconductor drum 1Y.

Note that the other four process cartridges 6M, 6C, 6K, and 6S have a configuration similar to that of the process cartridge 6Y for yellow except for the color of toner used therein, and form magenta, cyan, black, and special color toner images, respectively. Thus, for brevity, only the process cartridge 6Y is described below and descriptions of the other four process cartridges 6M, 6C, 6K, and 6S are omitted.

With reference to FIG. 2, it is to be noted that the photoconductor drum 1Y is rotated counterclockwise in FIG. 2 by a drive motor. The charger 4Y uniformly charges a surface of the photoconductor drum 1Y at a position opposite the charger 4Y (a charging process).

When the surface of the photoconductor drum 1Y reaches a position where the surface of the photoconductor drum 1Y is irradiated with a laser beam L emitted from the exposure device (writing device) 7Y, the photoconductor drum 1Y is scanned with the laser beam L, and thus an electrostatic latent image for yellow is formed on the surface of the photoconductor drum 1Y (an exposure process).

Then, the photoconductor drum 1Y reaches a position opposite the developing device 5Y, where the electrostatic latent image is developed with toner into a yellow toner image (a development process).

When the surface of the photoconductor drum 1Y carrying the toner image reaches a position opposite a primary transfer roller 9Y via the intermediate transfer belt 8, the toner image on the photoconductor drum 1Y is transferred onto the intermediate transfer belt 8 (a primary transfer process). After the primary transfer process, a certain amount of untransferred toner remains on the photoconductor drum 1Y.

When the surface of the photoconductor drum 1Y reaches a position opposite the cleaner 2Y, a cleaning blade 2a collects the untransferred toner from the photoconductor drum 1Y into the cleaner 2Y (a cleaning process).

Subsequently, the surface of the photoconductor drum 1Y reaches a position opposite a discharger, and the discharger removes residual potentials from the photoconductor drum 1Y to complete a sequence of image formation processes performed on the photoconductor drum 1Y.

The above-described image formation processes are performed in the process cartridges 6M, 6C, 6K, and 6S similarly to the process cartridge 6Y for yellow. That is, the exposure devices 7M, 7C, 7K, and 7S disposed above the process cartridges 6M, 6C, 6K, and 6S irradiate respective photoconductor drums 1M, 1C, 1K, and 1S of the process cartridges 6M, 6C, 6K, and 6S with the laser beams L based on image data. Specifically, the exposure devices 7Y, 7M, 7C, 7K, and 7S includes light sources to emit the laser beams L. The laser beams L are directed to the respective photoconductor drums 1Y, 1M, 1C, 1K, and 1S via the multiple optical elements while being deflected by the polygon mirror that is rotated by a motor.

Then, the respective single-color toner images formed on the respective photoconductor drums 1Y, 1M, 1C, 1K, and 1S through the development process are primarily transferred to and superimposed on the intermediate transfer belt 8. Thus, a desired multicolor toner image is formed on the intermediate transfer belt 8.

In FIG. 1, the intermediate transfer unit 15 includes the intermediate transfer belt 8, the five primary transfer rollers 9Y, 9M, 9C, 9K, and 9S (see FIG. 2), a drive roller, a secondary transfer backup roller, multiple tension rollers, a cleaning backup roller, and a belt cleaner. The intermediate transfer belt 8 is supported by and entrained around multiple rollers to rotate in the direction indicated by arrow A1 illustrated in FIG. 1 (clockwise) as one (the drive roller) of the multiple rollers rotates.

The five primary transfer rollers 9Y, 9M, 9C, 9K and 9S are pressed against the corresponding photoconductor drums 1Y, 1M, 1C, 1K, and 1S, respectively, via the intermediate transfer belt 8 to form primary transfer nips. A transfer voltage (primary transfer bias) opposite in polarity to the toner is applied to each of the primary transfer rollers 9Y, 9M, 9C, 9K, and 9S.

The intermediate transfer belt 8 rotates in the direction indicated by arrow A1 in FIG. 1 and sequentially passes through the primary transfer nips of the primary transfer rollers 9Y, 9M, 9C, 9K, and 9S. Then, the single-color toner images on the photoconductor drums 1Y, 1M, 1C, 1K, and 1S are primarily transferred to and superimposed on the intermediate transfer belt 8.

Subsequently, the intermediate transfer belt 8 carrying the multicolor toner image reaches a position opposite the secondary transfer roller 19. At this position, the secondary transfer backup roller and the secondary transfer roller 19 press against each other via the intermediate transfer belt 8, thereby forming a secondary transfer nip where images are formed on sheets P. The multicolor toner image on the intermediate transfer belt 8 is transferred onto a sheet P such as paper transported to the secondary transfer nip (a secondary transfer process). At that time, toner that is not transferred onto the sheet P remains on the surface of the intermediate transfer belt 8.

The surface of the intermediate transfer belt 8 reaches a position opposite the belt cleaner. At this position, the belt cleaner collects the untransferred toner remaining on the intermediate transfer belt 8 to complete a series of image transfer processes performed on the intermediate transfer belt 8.

As described above, the process cartridges 6Y, 6M, 6C, 6K, and 6S, the exposure devices 7Y, 7M, 7C, 7K, and 7S, the intermediate transfer unit 15, the secondary transfer roller 19, and the like function as an image formation device to form toner images on the sheets P.

With reference to FIG. 1, the sheet P is transported from a sheet feeding unit (sheet tray) 26 disposed in a lower portion of the image forming apparatus 100 to the secondary transfer nip where images are formed on sheets P, through a sheet feeding path K1 along which a sheet feeding roller 27 and a registration roller pair 28 are disposed.

Specifically, the sheet feeding unit 26 contains a stack of multiple sheets P. As the sheet feeding roller 27 rotates counterclockwise in FIG. 1, the sheet feeding roller 27 feeds a top sheet P from the stack in the sheet feeding unit 26 to a roller nip between the registration roller pair 28.

The registration roller pair (timing roller pair) 28 temporarily stops rotating, stopping the sheet P with a leading edge of the sheet P nipped between the registration roller pair 28. The registration roller pair 28 rotates to transport the sheet P to the secondary transfer nip, timed to coincide with the arrival of the multicolor toner image on the intermediate transfer belt 8. Thus, the desired multicolor toner image is transferred onto the sheet P.

Subsequently, the sheet P, onto which the multicolor image is transferred at the secondary transfer nip, is transported to a fixing device 20. In the fixing device 20, a fixing belt and a pressing roller apply heat and pressure to the sheet P to fix the multicolor toner image on the sheet P (a fixing process).

The sheet P is transported through an ejection path K2 and ejected by an output roller pair to the outside of the image forming apparatus 100. The sheets P ejected by the output roller pair are sequentially stacked as output images on a stack tray, thus completing a sequence of image formation processes in single-side printing performed in the image forming apparatus 100.

With reference to FIG. 1, in single-side printing, the sheet P is ejected from the image forming apparatus 100 after the toner image is fixed on the front side of the sheet P. By contrast, in duplex printing to form toner images on both sides (front side and back side) of the sheet P, the sheet P after the fixing process of the front side is guided to a reverse path K3 by a switching pawl. After a direction of conveyance of the sheet P is reversed in the reverse path K3, the sheet P is guided to a duplex-printing path K4. Subsequently, the sheet P guided to the duplex-printing path K4 is again transported to the secondary transfer nip where images are formed on the sheet P. Then, through the image formation processes (image forming operations) similar to those described above, the toner image is transferred onto the back side of the sheet P at the secondary transfer nip and fixed thereon by the fixing device 20, after which the sheet P is ejected from the image forming apparatus 100 via the ejection path K2.

Next, a configuration and operation of the developing device 5Y of the process cartridge 6Y are described in further detail below with reference to FIG. 2.

A casing of the developing device 5Y to contain developer G is divided, at least partially, into two developer-containing compartments. The developing device 5Y includes a developing roller 51 opposed to the photoconductor drum 1Y, a doctor blade 52 opposed to the developing roller 51, two conveying screws 55 respectively disposed in the developer-containing compartments, a density sensor 56 to detect a concentration (percentage) of toner in the developer G or toner density, and an opening 57 to supply toner to the developer-containing compartment. The developing roller 51 includes stationary magnets, a sleeve that rotates around the magnets, and the like. The developer-containing compartment contains the two-component developer G including carrier and toner.

The developing device 5Y operates as follows.

The sleeve of the developing roller 51 rotates in the direction indicated by arrow A2 in FIG. 2. The developer G is carried on the developing roller 51 by a magnetic field generated by the magnets. As the sleeve rotates, the developer G moves along a circumference of the developing roller 51.

The percentage (concentration) of toner in the developer G (ratio of toner to carrier) in the developing device 5Y is adjusted within a predetermined range. More specifically, the toner supply device 90Y supplies toner from the toner container 32Y to the developing device 5Y through a toner conveyance path 98 as the toner in the developing device 5Y is consumed.

While being stirred and mixed with the developer G by the two conveying screws 55 in the developing device 5Y (or the developer-containing compartments), the supplied toner is circulated between the two developer-containing compartments, which are separated by a partition wall, in a longitudinal direction of the developing device 5Y. The longitudinal direction of the developing device 5Y is perpendicular to the surface of the paper on which FIG. 2 is drawn. The toner in the two-component developer G is triboelectrically charged by friction with the carrier and electrostatically attracted to the carrier. Then, the toner is carried on the developing roller 51 together with the carrier by the magnetic force generated on the developing roller 51.

The developer G carried on the developing roller 51 is transported along an outer circumference of the sleeve in the clockwise direction indicated by arrow A2 in FIG. 2 to the doctor blade 52. The amount of developer G on the developing roller 51 is adjusted by the doctor blade 52, after which the developer G is carried to a development range opposed to the photoconductor drum 1Y. The toner in the developer G is attracted to the electrostatic latent image formed on the photoconductor drum 1Y due to the effect of an electric field generated in the development range. As the sleeve rotates, the developer G remaining on the developing roller 51 reaches an upper part of the developer-containing compartment, drops from the developing roller 51, and returns to the developer-containing compartment.

Next, with reference to FIGS. 3A to 5C, image recording media PT according to the present embodiments are described below.

Figure 3A:
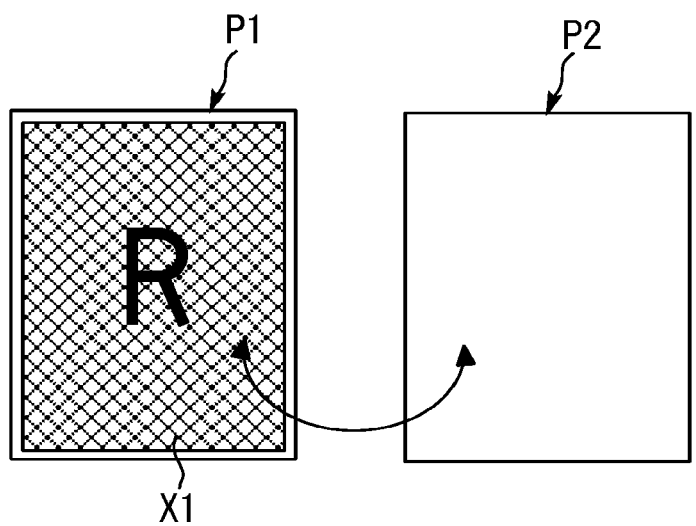
FIG. 3A is a schematic view of first and second transparent resin sheets as viewed from the front side according to an embodiment of the present disclosure.
Figure 3B:
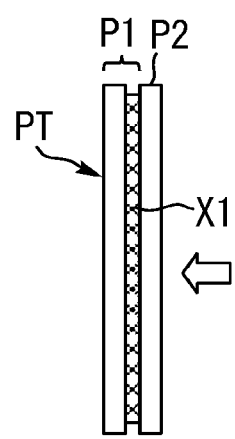
FIG. 3B is a side view of an image recording medium formed by bonding the first and second transparent resin sheets in FIG. 3A.

An image recording medium PT illustrated in FIG. 3B is a composite sheet that includes two sheets P1 and P2, and a toner image (information image X1) interposed between the two sheets P1 and P2. The toner image (information image X1) serves as an adhesive to bond the two sheet P1 and P2 overlaid on each other.

According to the image recording medium PT of the present embodiment, the two sheets P1 and P2 are both made of resin, and a transparent portion is provided to enable the toner image (information image X1) to be visible through at least one of the two sheets P1 and P2. In other words, the two sheets P1 and P2 are made of a water-resistant material, and the at least one of the two sheets P1 and P2 has the transparent portion to enable the toner image (information image X1) to be visible.

Note that the "transparent portion" (or the term "transparent" as used herein) can have a transparency (or transparent state) that is sufficient to allow an image on the opposite side of the transparent portion to be visible, and need not necessarily be 100% transparent.

Specifically, in the present embodiment, the two sheets included in the image recording medium PT are both transparent resin sheets (i.e., a first transparent resin sheet P1 and a second transparent resin sheet P2). Hereinafter, the first and second transparent resin sheets P1 and P2 are also simply referred to as "two sheets P1 and P2" or "two transparent resin sheets P1 and P2". That is, both sheets P1 and P2 are entirely transparent. The two transparent resin sheets P1 and P2 are made of a water-resistant transparent resin material such as polyethylene terephthalate (PET).

More specifically, as illustrated in FIG. 3A, the information image X1 (toner image) intended by a user is formed on almost the entire surface of the first transparent resin sheet P1. The information image X1 (toner image) is formed in single color or mixed multiple colors of yellow, magenta, cyan, black, and/or a special color. In the example of FIG. 3A, the letter "R" is formed at the center of the surface of the first transparent resin sheet P1, and the other portion is formed in a different color. Then, the second transparent resin sheet P2, on which no image is formed, is overlaid on the first transparent resin sheet P1 so that the information image X1 formed on the surface (front surface) of the first transparent resin sheet P1 is interposed between the two sheets P1 and P2. At that time, pressure and heat (or only pressure) are applied to the two transparent resin sheets P1 and P2 that are overlaid, thereby producing the image recording medium PT illustrated in FIG. 3B by the information image X1 (toner image) serving as the adhesive.

In the image recording medium PT produced as described above, the information image X1 formed on the first transparent resin sheet P1 is visible in the direction indicated by the white arrow in FIG. 3B with the second transparent resin sheet P2 as the front side.

Figure 4A:
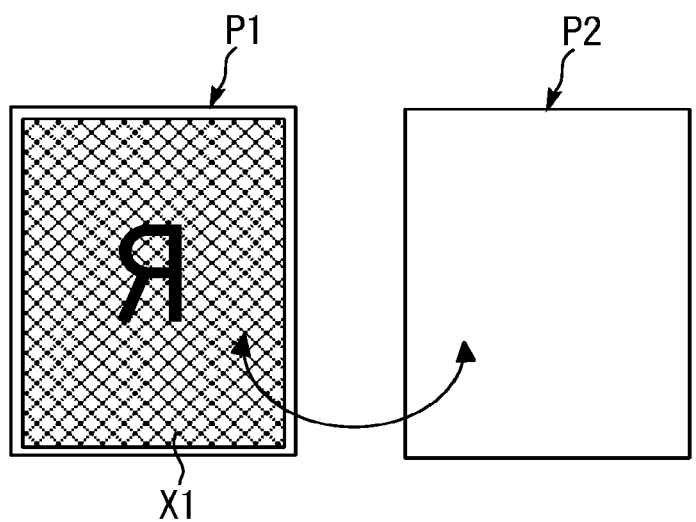
FIG. 4A is a schematic view of first and second transparent resin sheets as viewed from the front side according to another embodiment of the present disclosure.

On the other hand, in the example of FIG. 4A, the inverted letter "R" (i.e., a mirror image of the image intended by a user) is formed at the center of the surface of the first transparent resin sheet P1, and the other portion is formed in different color. Then, the second transparent resin sheet P2 is overlaid on the first transparent resin sheet P1 so that the information image X1 formed on the surface (front surface) of the first transparent resin sheet P1 is interposed between the two sheets P1 and P2, and pressure and heat are applied to the two transparent resin sheets P1 and P2, thereby producing an image recording medium PT illustrated in FIG. 4B.

Figure 4B:
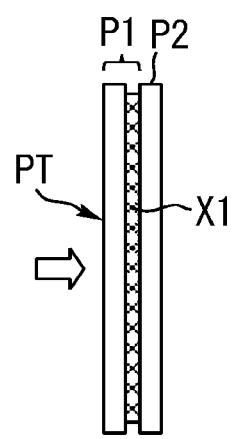
FIG. 4B is a side view of an image recording medium formed by bonding the first and second transparent resin sheets in FIG. 4A.

In the image recording medium PT produced as described above, the information image X1 formed on the first transparent resin sheet P1 is visible in the direction indicated by the white arrow in FIG. 4B with the first transparent resin sheet P1 as the front side.

As described above, the image recording medium PT according to the present embodiment includes the two sheets P1 and P2 that are overlaid and bonded by the toner image as the adhesive. Accordingly, there are fewer restrictions, and the image recording medium PT is inexpensive and convenient and can be easily produced as compared with the case in which a different adhesive is used separately.

In addition, since the image recording medium PT according to the present embodiment is formed by bonding two transparent resin sheets P1 and P2 together, the image recording medium PT has high water resistance and high durability and is less likely to be scratched as compared with an image recording medium using plain paper. In addition, the image recording medium PT according to the present embodiment is formed by bonding two transparent resin sheets P1 and P2 made of the same material together. Accordingly, the degrees of expansion and contraction of the two sheets due to environmental changes are equivalent, and the image recording medium PT is less likely to curl as compared with a case in which two sheets made of different materials are bonded together.

Therefore, the image recording medium PT according to the present embodiment is suitable as a medium, on which information is recorded, used in a wet environment, an environment in which durability is required, or a fluctuating environment.

In the present embodiment, the information image X1 is formed over almost the entire surface between the two sheets P1 and P2, and the two sheets P1 and P2 are bonded by the information image X1 (toner image) as the adhesive to form the image recording medium PT. However, an area of the toner image as the adhesive interposed between the two sheets P1 and P2 is not limited to the entire surface. For example, a toner image as the adhesive can be interposed only along the edges of the surface of the two sheets P1 and P2 with a substantially annular shape, and the central portion of the surface of the two sheets P1 and P2 can be seen through without a toner image interposed in the central portion. In such a case, the toner image serving as the adhesive may be a single color or multiple colors.

Here, in the present embodiment, the image recording medium PT is produced by the image forming apparatus 100 described above with reference to FIGS. 1 and 2. When an image recording medium PT is produced, the "special print mode" is selected by the control panel instead of the normal printing operations (image forming operations) described with reference to FIGS. 1 and 2.

Hereinafter, descriptions are provided of a method of producing the image recording medium PT and the image forming apparatus 100 to produce the image recording medium PT.

As described above with reference to FIGS. 3 and 4, in the image recording medium PT, the toner image (information image X1) is interposed between the first transparent resin sheet P1 and the second transparent resin sheet P2. The first transparent resin sheet P1 and the second transparent resin sheet P2 are overlaid and bonded by the toner image (information image X1) serving as the adhesive.

Such a method of producing the image recording medium PT is roughly classified into an image forming process, a fixing process, and an adhesion process.

The image forming process is a process of forming a toner image on the front surface of the first transparent resin sheet P1 and performed by the image forming device of the image forming apparatus 100 including: the process cartridges 6Y, 6M, 6C, 6K, and 6S; the exposure devices 7Y, 7M, 7C, 7K, and 7S; the intermediate transfer unit 15; and secondary transfer roller 19.

The fixing process is a process of applying pressure and heat to the toner image formed on the front surface of the first transparent resin sheet P1 in the image forming process to fix the toner image on the front surface and performed by the fixing device 20.

The adhesion process is a process of applying pressure, or pressure and heat to the two sheets P1 and P2 overlaid to bond the first transparent resin sheet P1 and the second transparent resin sheet P2 by the toner image as the adhesive. The second transparent resin sheet P2 is overlaid on the front side of the first transparent resin sheet P1 on which the toner image is fixed in the fixing process. In the present embodiment, the adhesion process is performed by at least one of the fixing device 20 and the registration roller pair 28 that transports the sheet P toward the image forming device. That is, the registration roller pair 28 and the fixing device 20 function as an adhesion device to bond the first transparent resin sheet P1 and the second transparent resin sheet P2.

Figure 5A:
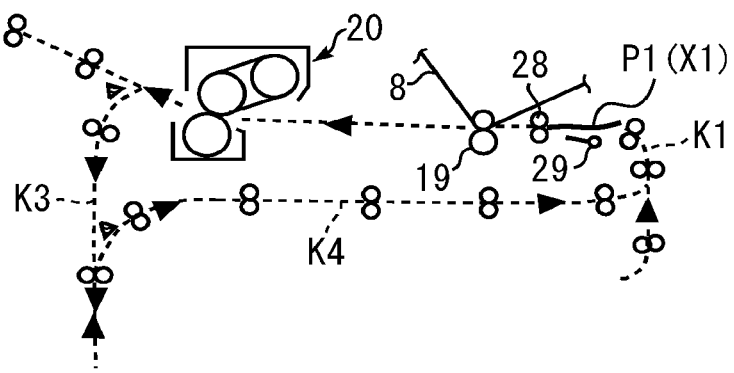
FIGS. 5A to 5C are schematic diagrams illustrating a process of producing the image recording medium made of the first and second transparent resin sheets according to the embodiments of the present disclosure.
Figure 5B:
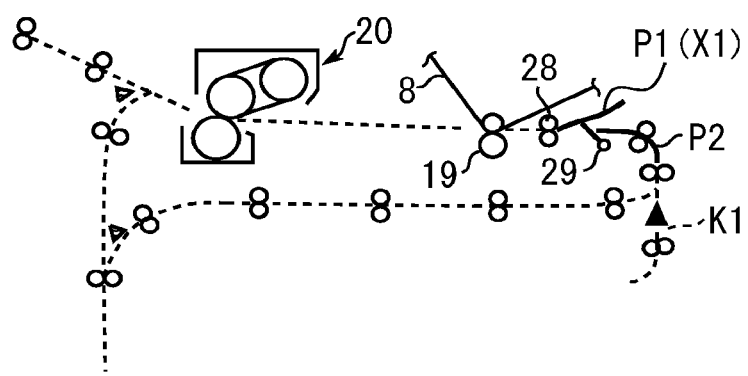
Figure 5C:
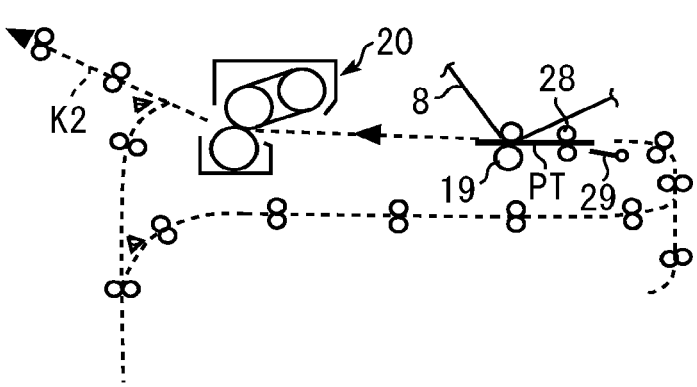

FIGS. 5A to 5C are schematic diagrams illustrating a process of producing the image recording media PT illustrated in FIGS. 3B and 4B.

When the image recording medium PT is produced, transparent resin sheets are set in the sheet feeding unit 26. Further, the "special print mode" is selected by the control panel of the image forming apparatus 100 or a personal computer communicably connected to the image forming apparatus 100. The information image X1 to be formed on the image recording medium PT is also input by the control panel or the personal computer.

First, the image forming process and the fixing process are performed on the first transparent resin sheet P1, and the first transparent resin sheet P1 is transported to the position of the registration roller pair 28 as illustrated in FIG. 5A. Specifically, similarly to the "duplex printing mode" described above with reference to FIG. 1, the image forming process and the fixing process are performed on the first transparent resin sheet P1 fed from the sheet feeding unit 26. The first transparent resin sheet P1 on which the desired toner image (information image X1) is fixed is transported to the position of the registration roller pair 28 via the reverse path K3 and the duplex-printing path K4. Thus, the first transparent resin sheet P1 is on standby at the position. At that time, the toner image (information image X1) on the front surface of the first transparent resin sheet P1 faces downward (the front surface of the first transparent resin sheet P1 faces downward).

Then, as illustrated in FIG. 5B, the second transparent resin sheet P2 is fed from the sheet feeding unit 26 toward the position of the registration roller pair 28 where the first transparent resin sheet P1 is on standby. At that time, since the information image X1 on the lower surface of the first transparent resin sheet P1 is about to be sandwiched between the first transparent resin sheet P1 and the second transparent resin sheet P2, a switching member 29 lifts the first transparent resin sheet P1 upward. The switching member 29 has a shape that does not hinder the conveyance of the second transparent resin sheet P2.

Then, as illustrated in FIG. 5C, in a state in which the tip of the first transparent resin sheet P1 and the tip of the second transparent resin sheet P2 are aligned at the nip of the registration roller pair 28, the registration roller pair 28 starts rotating, thereby transporting the two transparent resin sheets P1 and P2. As a result, the pressure of the nip of the registration roller pair 28 causes the information image X1 serving as the adhesive to bond the first and second transparent resin sheet P1 and P2.

Specifically, since not much time has passed since the fixing process has been performed on the first transparent resin sheet P1 on standby at the position of the registration roller pair 28, the two transparent resin sheets P1 and P2 pass through the nip of the registration roller pair 28 with the information image X1 (toner image) whose temperature is high to certain extent. Therefore, the information image X1 (toner image) sufficiently functions as the adhesive even with only the pressure by the registration roller pair 28, thereby bonding the two transparent resin sheets P1 and P2. Thus, the image recording medium PT in which the two transparent resin sheets P1 and P2 are bonded is produced.

Thereafter, the image recording medium PT produced at the position of the registration roller pair 28 passes through the secondary transfer nip and then the fixing device 20, and is ejected from the image forming apparatus 100 via the ejection path K2. At that time, pressure is applied to the two transparent resin sheets P1 and P2 in a state in which the information image X1 (toner image) is heated and melted by the pressure and heat by the fixing device 20. Therefore, the adhesive strength between the two transparent resin sheets P1 and P2 using the information image X1 (toner image) as the adhesive is enhanced.

Variation 1

FIG. 6A is a schematic view of first and second transparent resin sheets P1 and P2 according to Variation 1 as viewed from the front side, and FIG. 6B is a side view of an image recording medium PT according to Variation 1 formed by bonding the first and second transparent resin sheets P1 and P2. FIGS. 6A and 6B correspond to FIGS. 3A and 3B in the above-described embodiment, respectively. FIGS. 7A to 7D are schematic diagrams illustrating a process of producing the image recording medium PT according to Variation 1, corresponding to FIGS. 5A to 5C in the above-described embodiment.

Similarly to the above-described embodiment, the image recording medium PT according to Variation 1 is also formed by bonding together the two transparent resin sheets P1 and P2 using the toner image (information image X1) as the adhesive. However, there is a difference in the toner (information image) used as the adhesive.

In Variation 1, as illustrated in FIG. 6A, the information image X1 (first toner image) intended by a user is formed on almost the entire surface of the first transparent resin sheet P1. The information image X1 (first toner image) is formed in single color or mixed multiple colors among yellow, magenta, cyan, black, and special color. An information image X2 (second toner image) that is a mirror image of the information image X1 (first toner image) on the first transparent resin sheet P1 is formed on the front surface of the second transparent resin sheet P2. That is, the toner image includes two information images X1 and X2.

In the example of FIG. 6A, the letter "R" is formed at the center of the surface of the first transparent resin sheet P1, and the other portion is formed in a different color. The information image X2 obtained by inverting the information image X1 on the first transparent resin sheet P1 is formed on the surface of the second transparent resin sheet P2. Then, the first and second transparent resin sheets P1 and P2 are overlaid so that the information images X1 formed on the front surface of the first transparent resin sheet P1 and the information image X2 formed on the front surface of the second transparent resin sheet P2 are interposed between the first and second transparent resin sheets P1 and P2 while being superimposed one on another. At that time, pressure and heat (or only pressure) are applied to the two transparent resin sheets P1 and P2 that are overlaid, thereby producing the image recording medium PT illustrated in FIG. 6B with the information images X1 and X2 (first and second toner images) serving as the adhesive.

In the image recording medium PT produced as described above, the information images X1 and X2 formed on the first and second transparent resin sheets P1 and P2 are visible in the direction indicated by the white arrow in FIG. 6B with the second transparent resin sheet P2 as the front side.

When the image recording medium PT according to Variation 1 is produced using the image forming apparatus 100, in addition to the image forming process (i.e., first image forming process), the fixing process (i.e., first fixing process), and the adhesion process described above with reference to FIGS. 5A to 5C, a second image forming process and a second fixing process are performed.

The second image forming process is a process of forming the information image X2 (second toner image) on the front surface of the second transparent resin sheet P2 and is performed by the image forming device of the image forming apparatus 100. The information image X2 (second toner image) formed on the front surface of the second transparent resin sheet P2 in the second image forming process is a mirror image of the information image X1 (first toner image) of the first transparent resin sheet P1.

The second fixing process is a process of applying pressure and heat to the information image X2 (second toner image) formed on the front surface of the second transparent resin sheet P2 in the second image forming process to fix the information image X2 (second toner image) on the front surface and performed by the fixing device 20.

The adhesion process according to Variation 1 is a process of applying pressure, or pressure and heat to the overlaid two sheets P1 and P2 to bond the first transparent resin sheet P1 and the second transparent resin sheet P2 by the information images X1 and X2 (first toner image and second toner image) as the adhesive in a state in which the second transparent resin sheet P2 on which the information image X2 is fixed is overlaid on the first transparent resin sheet P1 on which the information image X1 is fixed while the front surface of the second transparent resin sheet P2 and the front surface of the first transparent resin sheet P1 face each other. Also in Variation 1, the adhesion process is performed by at least one of the registration roller pair 28 and the fixing device 20.

FIGS. 7A to 7D are schematic diagrams illustrating a process of producing the image recording medium PT illustrated in FIG. 6B.

Figure 7A:
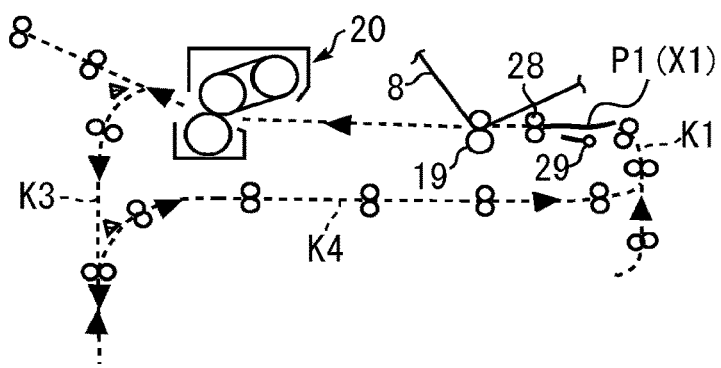
FIGS. 7A to 7D are schematic diagrams illustrating a process of producing the image recording medium made of the first and second transparent resin sheets according to Variation 1.

First, the first image forming process and the first fixing process are performed on the first transparent resin sheet P1, and the first transparent resin sheet P1 is transported to the position of the registration roller pair 28 as illustrated in FIG. 7A. Similar to the duplex printing mode described above with reference to FIG. 1, the first image forming process and the first fixing process are performed on the first transparent resin sheet P1 fed from the sheet feeding unit 26. The first transparent resin sheet P1 on which the desired toner image (information image X1) is fixed is transported to the position of the registration roller pair 28 via the reverse path K3 and the duplex-printing path K4. At that time, the first toner image (information image X1) on the front surface of the first transparent resin sheet P1 faces downward.

Figure 7B:
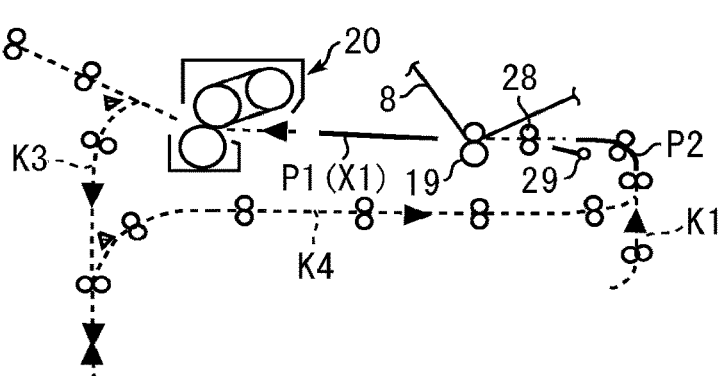

Then, as illustrated in FIG. 7B, the first transparent resin sheet P1 is further transported toward the position of the registration roller pair 28 via the reverse path K3 and the duplex-printing path K4, and the second transparent resin sheet P2 is fed from the sheet feeding unit 26 to form the information image X2 at the secondary transfer nip in the second image forming process.

Figure 7C:
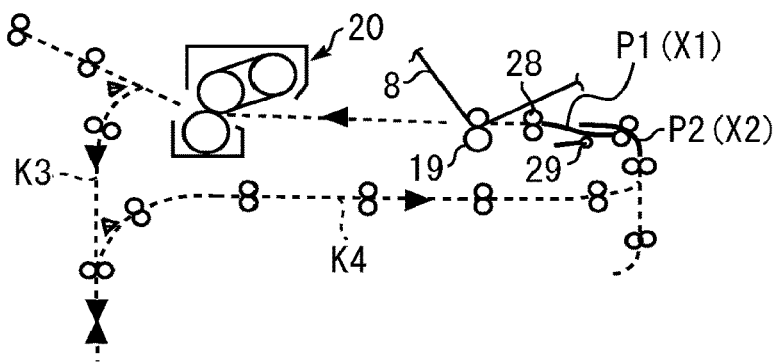

Thus, the second image forming process and the second fixing process are performed. Thereafter, as illustrated in FIG. 7C, the second transparent resin sheet P2 on which the desired toner image (information image X2) is fixed is transported, via the reverse path K3 and the duplex-printing path K4, toward the position of the registration roller pair 28 where the first transparent resin sheet P1 is on standby. At that time, the information image X1 (first toner image) on the front surface of the first transparent resin sheet P1 faces upward, and the information image X2 (second toner image) on the front surface of the second transparent resin sheet P2 faces downward. Therefore, to superimpose the information image X1 on the upper surface of the first transparent resin sheet P1 and the information image X2 on the lower surface of the second transparent resin sheet P2, the second transparent resin sheet P2 is transported above the first transparent resin sheet P1 positioned below under the gravity. The switching member 29 does not lift the first transparent resin sheet P1.

Figure 7D:
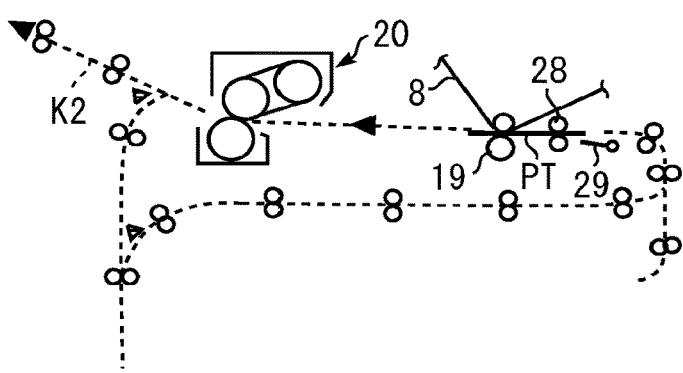

Then, as illustrated in FIG. 7D, in a state in which the tip of the first transparent resin sheet P1 and the tip of the second transparent resin sheet P2 are aligned at the nip of the registration roller pair 28, the registration roller pair 28 starts rotating, thereby transporting the two transparent resin sheets P1 and P2. As a result, pressure of the nip of the registration roller pair 28 causes the information images X1 and X2 as the adhesive to bond the first and second transparent resin sheet P1 and P2.

Thereafter, the image recording medium PT produced at the position of the registration roller pair 28 passes through the secondary transfer nip and then the fixing device 20, and is ejected from the image forming apparatus 100 via the ejection path K2. At that time, in the image recording medium PT, the two transparent resin sheets P1 and P2 are more strongly bonded by pressure and heat by the fixing device 20.

In Variation 1, effects similar to those of the above-described embodiments are also attained.

Variation 2

Figure 8A:
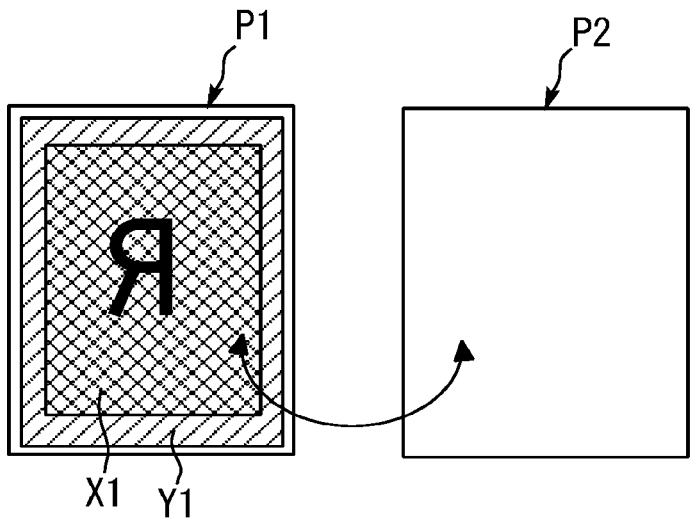
FIG. 8A is a schematic view of first and second transparent resin sheets as viewed from the front side according to Variation 2.
Figure 8B:
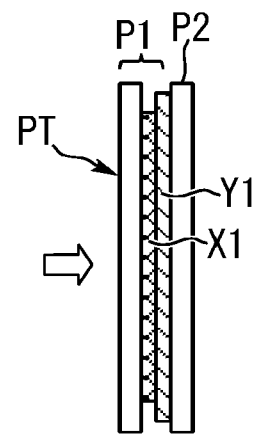
FIG. 8B is a side view of an image recording medium formed by bonding the first and second transparent resin sheets in FIG. 8A.

FIG. 8A is a schematic view of first and second transparent resin sheets P1 and P2 according to Variation 2 as viewed from the front side, and FIG. 8B is a side view of an image recording medium PT according to Variation 2 formed by bonding the first and second transparent resin sheets P1 and P2. FIGS. 8A and 8B correspond to FIGS. 3A and 3B in the above-described embodiment, respectively.

Similarly to the above-described embodiment, the image recording medium PT according to Variation 2 is also formed by bonding the two transparent resin sheets P1 and P2 using the toner image (information image X1) as the adhesive. In addition to the information image X1 (toner image) as the adhesive, a background image Y1 (solid image) is used, differing from the image recording medium PT of the above-described embodiment.

In Variation 2, as illustrated in FIG. 8A, the information image X1 (toner image) that is a mirror image of an image intended by a user is formed on the front surface of the first transparent resin sheet P1. Additionally, the background image Y1 as the solid image is formed so as to cover the information image X1. That is, the toner image includes the information image X1 and the background image Y1.

In the example of FIG. 8A, the information image X1 that is a mirror image in which the letter "R" is inverted is formed on the surface of the first transparent resin sheet P1 and the monochrome background image Y1 as the solid image is formed in the entire area where images can be formed (i.e., area except for the margin defined by the setting of the image forming apparatus 100 or image-formable area) of the first transparent resin sheet P1. Then, the first and second transparent resin sheets P1 and P2 are overlaid so that the information image X1 and the background image Y1 formed on the front surface of the first transparent resin sheet P1 are interposed between the first and second transparent resin sheets P1 and P2. At that time, pressure and heat (or only pressure) are applied to the two transparent resin sheets P1 and P2 that are overlaid, thereby producing the image recording medium PT illustrated in FIG. 8B by the information images X1 and the background image Y1 (toner image) serving as the adhesive.

In the image recording medium PT produced as described above, the information image X1 on the background image Y1 is visible when viewed from the first transparent resin sheet P1 in the direction indicated by the white arrow in FIG. 8B.

As described above, in Variation 2, the toner image as the adhesive that bonds the two transparent resin sheets P1 and P2 includes the background image Y1 (solid image) in addition to the information image X1.

In the image recording medium PT according to Variation 2, the background image Y1 (solid image) is preferably formed in a color other than yellow, magenta, cyan, and black. This background image Y1 makes the information image X1 formed in a single color or a plurality of colors selected from yellow, magenta, cyan, and black recognizable. That is, the color reproducibility of the information image X1 formed on the background image Y1 is improved.

In particular, in the image recording medium PT according to Variation 2, when the background image Y1 (solid image) is formed in white, the legibility of the information image X1 formed on the background image Y1 is further improved.

Here, the process of producing the image recording medium PT according to Variation 2 is substantially the same as the production process described above with reference to FIGS. 5A to 5C. However, the toner image formed on the front surface of the first transparent resin sheet P1 in the image forming process includes the mirror image (information image X1) formed directly on the front surface of the first transparent resin sheet P1 and the solid image (background image Y1) formed over the entire image-formable area of the first transparent resin sheet P1 so as to cover the mirror image (information image X1).

In such an image forming process, the mirror image (information image X1) and the solid image (background image Y1) are superimposed on the intermediate transfer belt 8, and then the superimposed images X1 and Y1 are transferred to the first transparent resin sheet P1 at the position of the secondary transfer nip. In this case, when the same color toner (or the same process cartridge) is used to form the information image X1 and the background image Y1, or when the information image X1 is not overlaid on the background image Y1 on the intermediate transfer belt 8 due to the arrangement of the process cartridges 6Y, 6M, 6C, 6K, and 6S, the image forming process is performed so that the intermediate transfer belt 8 passes through the positions of the process cartridges 6Y, 6M, 6C, 6K, and 6S twice or more.

In Variation 2, effects similar to those of the above-described embodiments are also attained.

Variation 3

Figure 9A:
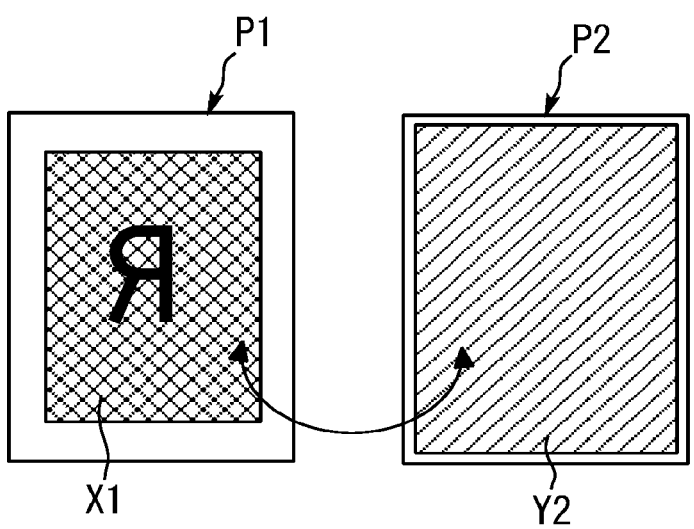
FIG. 9A is a schematic view of first and second transparent resin sheets as viewed from the front side according to Variation 3.
Figure 9B:
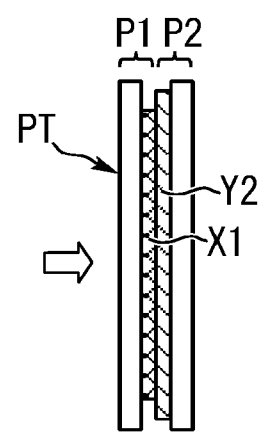
FIG. 9B is a side view of an image recording medium formed by bonding the first and second transparent resin sheets in FIG. 9A.

FIG. 9A is a schematic view of first and second transparent resin sheets P1 and P2 according to Variation 3 as viewed from the front side, and FIG. 9B is a side view of an image recording medium PT according to Variation 3 formed by bonding the first and second transparent resin sheets P1 and P2. FIGS. 9A and 9B correspond to FIGS. 3A and 3B in the above-described embodiment, respectively.

Similarly to Variation 2, in the image recording medium PT according to Variation 3, the toner image as the adhesive that bonds the two transparent resin sheets P1 and P2 includes a background image Y2 (solid image) in addition to the information image X1. In the production process, the background image Y2 (solid image) is formed on the second transparent resin sheet P2, differing from the image recording medium PT in the Variation 2.

In Variation 3, as illustrated in FIG. 9A, the information image X1 (first toner image) is formed as the mirror image on the front surface of the first transparent resin sheet P1. A background image Y2 (second toner image) as a solid image is formed on the front surface of the second transparent resin sheet P2.

In the example of FIG. 9A, the information image X1 that is the mirror image in which the letter "R" is inverted is formed on the surface of the first transparent resin sheet P1 and the monochrome background image Y2 as the solid image is formed in the entire image-formable area (i.e., area except for the margin defined by the setting of the image forming apparatus 100) of the second transparent resin sheet P2. Then, the first and second transparent resin sheets P1 and P2 are overlaid so that the information images X1 formed on the front surface of the first transparent resin sheet P1 and the background image Y2 formed on the front surface of the second transparent resin sheet P2 are interposed between the first and second transparent resin sheets P1 and P2. At that time, pressure and heat (or only pressure) are applied to the two transparent resin sheets P1 and P2 that are overlaid, thereby producing the image recording medium PT illustrated in FIG. 9B by the information images X1 and the background image Y2 (first and second toner images) serving as the adhesive.

In the image recording medium PT produced as described above, the information image X1 on the background image Y2 is visible when viewed from the first transparent resin sheet P1 in the direction indicated by the white arrow in FIG. 9B.

Note that, the background image Y2 (solid image) formed in a color other than yellow, magenta, cyan, and black (in particular, formed in white) improves the color reproducibility of the information image X1 formed on the background image Y2.

Here, the process of producing the image recording medium PT according to Variation 3 is substantially the same as the production process described above with reference to FIGS. 7A to 7D. However, the second toner image formed on the front surface of the second transparent resin sheet P2 in the second image forming process is the solid image (background image Y2) formed over the entire image-formable area of the second transparent resin sheet P2.

In Variation 3, effects similar to those of the above-described embodiments are also attained.

Variation 4

Figure 10A:
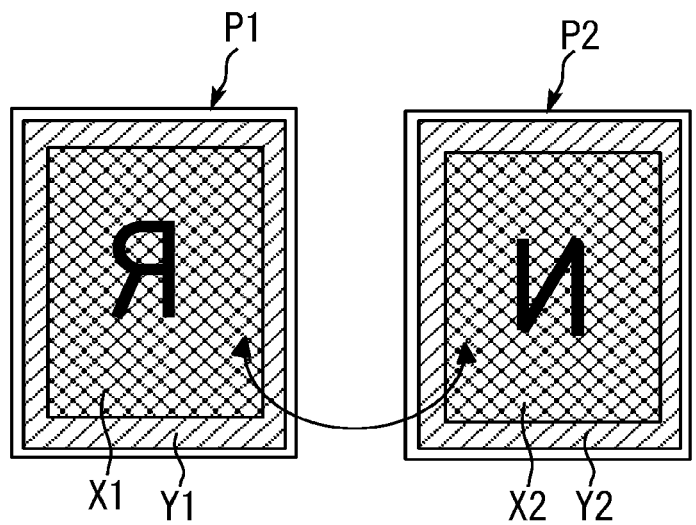
FIG. 10A is a schematic view of first and second transparent resin sheets as viewed from the front side according to Variation 4.
Figure 10B:
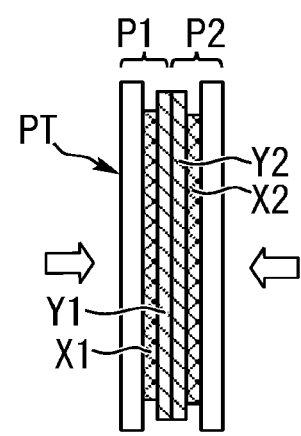
FIG. 10B is a side view of an image recording medium formed by bonding the first and second transparent resin sheets in FIG. 10A.

FIG. 10A is a schematic view of first and second transparent resin sheets P1 and P2 according to Variation 4 as viewed from the front side, and FIG. 10B is a side view of an image recording medium PT according to Variation 4 formed by bonding the first and second transparent resin sheets P1 and P2. FIGS. 10A and 10B correspond to FIGS. 3A and 3B in the above-described embodiment, respectively.

Similarly to Variations 2 and 3, in the image recording medium PT according to Variation 4, the toner image as the adhesive that bonds the two transparent resin sheets P1 and P2 includes the information image X1 and the background images Y1 and Y2 (solid image). In addition to the information image X1 visible when viewed from one side of the image recording medium PT, the information image X2 is formed so that the information image X2 is visible when viewed from the other side of the image recording medium PT, differing from the image recording media PT in the Variations 2 and 3. That is, in the image recording medium PT according to Variation 4, the two information images X1 and X2 are formed on the front surfaces of the first and second transparent resin sheet P1 and P2, respectively, so as to sandwich the background images Y1 and Y2 (solid images). That is, the information image X1 is formed on one side of the image recording medium PT with respect to the background images Y1 and Y2, and the information image X2 is formed on the other side of the image recording medium PT with respect to the background images Y1 and Y2. As a result, the information images X1 and X2 are visible when viewed from the one side and the other side, respectively.

In Variation 4, as illustrated in FIG. 10A, the information image X1 as the mirror image formed on the front surface of the first transparent resin sheet P1. Additionally, the background image Y1 as the solid image is formed so as to cover the information image X1. That is, the first toner image includes the information image X1 and the background image Y1. The information image X2 as the mirror image formed on the front surface of the second transparent resin sheet P2. Additionally, the background image Y2 as the solid image is formed so as to cover the information image X2. That is the second toner image includes the information image X2 and the background image Y2.

In the example of FIG. 10A, the information image X1 that is the mirror image of the intended image in which the letter "R" is inverted is formed at the center of the surface of the first transparent resin sheet P1, and the background image Y1 as the solid image is formed in the entire image-formable area where images can be formed of the first transparent resin sheet P1 so as to cover the information image X1 (mirror image). Further, the information image X2 that is a mirror image of an intended image in which the character "N" is inverted is formed at the center of the surface of the second transparent resin sheet P2 and the background image Y2 as the solid image is formed in the entire image-formable area where images can be formed of the second transparent resin sheet P2 so as to cover the information image X2 (mirror image).

Then, the first and second transparent resin sheets P1 and P2 are overlaid so that the information images X1 and the background image Y1 formed on the front surface of the first transparent resin sheet P1 and the information image X2 and the background image Y2 formed on the front surface of the second transparent resin sheet P2 are interposed between the first and second transparent resin sheets P1 and P2. At that time, pressure and heat (or only pressure) are applied to the two transparent resin sheets P1 and P2 that are overlaid, thereby producing the image recording medium PT illustrated in FIG. 10B by the information images X1 and X2 and the background images Y1 and Y2 serving as the adhesive.

In the image recording medium PT produced as described above, the information image X1 on the background image Y1 is visible when viewed from the first transparent resin sheet P1, and the information image X2 on the background image Y2 is visible when viewed from the second transparent resin sheet P2 in the direction indicated by the white arrow in FIG. 10B.

The background images Y1 and Y2 (solid images) may be formed in any color (for example, yellow, magenta, cyan, and black). However, the background images Y1 and Y2 (solid images) formed in a color other than yellow, magenta, cyan, and black (in particular, formed in white) improves the color reproducibility of the information images X1 and X2 formed on the background images Y1 and Y2, respectively.

Here, the process of producing the image recording medium PT according to Variation 4 is substantially the same as the production process described above with reference to FIGS. 7A to 7D. However, the second toner image formed on the front surface of the second transparent resin sheet P2 in the second image forming process includes the mirror image (information image X2) formed directly on the front surface of the second transparent resin sheet P2, and the solid image (background image Y2) formed over the entire image-formable area of the second transparent resin sheet P2 so as to cover the mirror image (information image X2).

Similarly to the first image forming process described in Variation 2, the second image forming process may be performed so that the intermediate transfer belt 8 passes through the positions of the process cartridges 6Y, 6M, 6C, 6K, and 6S twice or more, as required.

In Variation 4, effects similar to those of the above-described embodiments are also attained. In particular, in Variation 4, the duplex printed image recording medium PT can be provided that has high water resistance and durability and is less likely to curl.

Variation 5

Figure 11A:
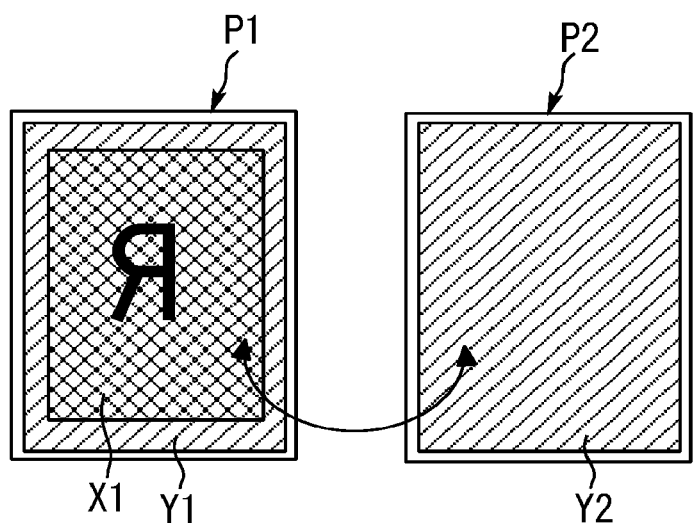
FIG. 11A is a schematic view of first and second transparent resin sheets as viewed from the front side according to Variation 5.
Figure 11B:
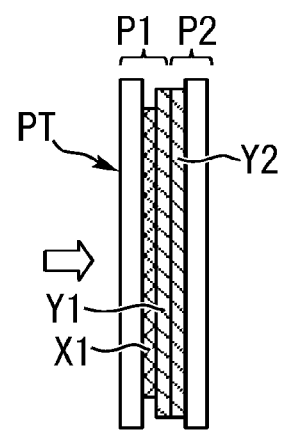
FIG. 11B is a side view of an image recording medium formed by bonding the first and second transparent resin sheets in FIG. 11A.

FIG. 11A is a schematic view of first and second transparent resin sheets P1 and P2 according to Variation 5 as viewed from the front side, and FIG. 11B is a side view of an image recording medium PT according to Variation 5 formed by bonding the first and second transparent resin sheets P1 and P2. FIGS. 11A and 11B correspond to FIGS. 3A and 3B in the above-described embodiment, respectively.

Similarly to Variation 2, in the image recording medium PT according to Variation 5, the toner image as the adhesive that bonds the two transparent resin sheets P1 and P2 includes the information image X1 and the background image Y1 (solid image). Further, the background image Y2 (solid image) is formed on the second transparent resin sheet P2, differing from the image recording medium PT in the Variation 2.

In Variation 5, as illustrated in FIG. 11A, the information image X1 as the mirror image is formed on the front surface of the first transparent resin sheet P1. Additionally, the background image Y1 as the solid image is formed so as to cover the information image X1. That is, the first toner image includes the information image X1 and the background image Y1. The background image Y2 (second toner image) as the solid image is formed on the front surface of the second transparent resin sheet P2.

In the example of FIG. 11A, the information image X1 that is the mirror image of the intended image in which the letter "R" is inverted is formed at the center of the surface of the first transparent resin sheet P1, and the background image Y1 as the solid image is formed in the entire image-formable area, where images can be formed, of the first transparent resin sheet P1. Further, the background image Y2 as the solid image is formed in the entire image-formable area on the surface of the second transparent resin sheet P2.

Then, the first and second transparent resin sheets P1 and P2 are overlaid so that the information images X1 and the background image Y1 formed on the front surface of the first transparent resin sheet P1 and the background image Y2 formed on the front surface of the second transparent resin sheet P2 are interposed between the first and second transparent resin sheets P1 and P2. At that time, pressure and heat (or only pressure) are applied to the two transparent resin sheets P1 and P2 that are overlaid, thereby producing the image recording medium PT illustrated in FIG. 11B by the information image X1 and the background images Y1 and Y2 serving as the adhesive.

In the image recording medium PT produced as described above, the information image X1 on the background images Y1 and Y2 is visible when viewed from the first transparent resin sheet P1 in the direction indicated by the white arrow in FIG. 11B.

The background images Y1 and Y2 (solid images) may be formed in any color (for example, yellow, magenta, cyan, and black). However, the background images Y1 and Y2 (solid images) formed in a color other than yellow, magenta, cyan, and black (in particular, formed in white) improves the color reproducibility of the information image X1 formed on the background images Y1 and Y2.

Here, the process of producing the image recording medium PT according to Variation 5 is substantially the same as the production process described above with reference to FIGS. 7A to 7D. However, the second toner image formed on the front surface of the second transparent resin sheet P2 in the second image forming process is the solid image (background image Y2) formed over the entire image-formable area of the second transparent resin sheet P2.

In Variation 5, effects similar to those of the above-described embodiments are also attained. In particular, in Variation 5, since the background images Y1 and Y2 are layered, the legibility of the information image X1 is further improved.

As described above, the image recording medium PT according to the above-described embodiments includes the two sheets P1, P2 and a toner image interposed between the two sheets P1 and P2. The toner image serves as an adhesive to bond the two sheets P1 and P2 and includes an information image X1. At least one of the two sheets P1 and P2 has a transparent portion to enable the information image X1 to be visible through the at least one of the two sheets P1 and P2.

With this configuration, an image recording medium having high water resistance can be provided. Therefore, according to the present disclosure, an image recording medium having high water resistance, a method of producing the image recording medium, and an image forming apparatus can be provided.

In the present embodiment, the two sheets (first and second transparent resin sheets P1 and P2) are bonded by the toner image to form the image recording medium PT, in which entire areas of the two sheets are transparent. Alternatively, two sheets, in which a part of areas of the two sheets are transparent, can be bonded by the toner image to form the image recording medium.

In such configurations, effects similar to those described above are also attained.

In the above-described embodiments, the two transparent resin sheets P1 and P2 are bonded by the toner image to form the image recording medium PT. However, both of the two sheets P1 and P2 of the image forming recording medium PT are not necessarily transparent water-resistant sheets. Even when one of the two sheets P1 and P2 is a transparent water-resistant sheet and the other is an opaque water-resistant sheet, effects similar to those described above are also attained.

For example, a transparent resin sheet and a white resin sheet (a white sheet made of resin that is a water-resistant material) can be bonded by the toner image to form the image recording medium PT. In this case, an information image (single-sided image) can be visible only when viewed from the transparent resin sheet. However, the legibility of the information image (single-sided image) can be improved as compared with the case in which a white solid image (background image) is formed between the two sheets and an information image is formed between the white solid image and the transparent resin sheet.

Further, a transparent resin sheet and a black resin sheet (a black sheet made of resin that is a water-resistant material) can be bonded by toner to form the image recording medium PT. In this case, an information image formed in colors other than black (in particular, formed in white) can be visible only when viewed from the transparent resin sheet. However, the legibility of the information image (single-sided image) can be improved as compared with the case in which a black solid image (background image) is formed between the two sheets and a white information image is formed between the black solid image and the transparent resin sheet.

The above-described embodiments are illustrative and do not limit the present disclosure. Thus, numerous additional modifications and variations are possible in light of the above teachings. It is therefore to be understood that within the scope of the present disclosure, the present disclosure may be practiced otherwise than as specifically described herein. The number, position, and shape of the components described above are not limited to those embodiments described above. Desirable number, position, and shape can be determined to perform the present disclosure.

In the present disclosure, the term "mirror image" is defined as an image obtained by inverting an image intended by a user to be formed (or inverting an original image) as if the image is reflected in a mirror.

What is claimed is:

1. An image recording medium comprising:
   a first sheet and a second sheet, each made of resin; and
   a first toner image including a first information image, and a second toner image including a second information image, the first and second toner images being interposed between the two sheets and serving as an adhesive to bond the two sheets together,
   wherein at least one of the two sheets has a transparent portion to enable the first and second information images to be visible through the at least one of the two sheets, and the first and second toner images are mirror images of one another.

2. The image recording medium according to claim 1, wherein the two sheets are transparent resin sheets.

3. The image recording medium according to claim 1, wherein at least one of the first and second toner images further includes a solid image of a color other than yellow, magenta, cyan, and black, and the solid image is formed in an entire image-formable area of the at least one of the two sheets.

4. The image recording medium according to claim 3, wherein the first information image is formed on a first side of the image recording medium with respect to the solid image so as to enable the first information image to be visible through the first side,
   wherein the second information image is formed on a second side of the image recording medium with respect to the solid image so as to enable the second information image to be visible through the second side, and
   wherein the first information image and the second information image sandwich the solid image.

5. The image recording medium according to claim 1, wherein at least one of the first and second toner images further includes a solid image that is white, and
   wherein the solid image is formed in an entire image-formable area of the at least one of the two sheets.

6. A method of producing an image recording medium, the method comprising:
   forming a toner image on a front surface of a first transparent resin sheet;
   forming a solid image on the toner image on the front surface of the first transparent sheet;
   applying pressure and heat to the toner image and the solid image on the front surface of the first transparent resin sheet to fix the toner image and the solid image on the front surface of the first transparent resin sheet; and
   applying pressure, or pressure and heat, to the first transparent resin sheet and a second transparent resin sheet to bond the first transparent resin sheet and the second transparent resin sheet together with the toner image and the solid image serving as an adhesive,
   the applying pressure, or pressure and heat, performed in a state in which the second transparent resin sheet is overlaid on the front surface of the first transparent resin sheet on which the toner image and the solid image are fixed.

7. The method according to claim 6,
   wherein the toner image formed on the front surface of the first transparent resin sheet is a mirror image formed directly on the front surface of the first transparent resin sheet and the solid image is formed in an entire image-formable area of the first transparent resin sheet so as to cover the mirror image.

8. The method according to claim 6, further comprising:
   forming another toner image on a front surface of the second transparent resin sheet; and
   applying pressure and heat to said another toner image on the front surface of the second transparent resin sheet to fix said another toner image on the front surface of the second transparent resin sheet,
   wherein the applying pressure, or pressure and heat, is performed in a state in which the second transparent resin sheet on which said another toner image is fixed is overlaid on the first transparent resin sheet on which the toner image and the solid image are fixed while the front surface of the second transparent resin sheet and the front surface of the first transparent resin sheet face each other.

9. The method according to claim 8, wherein said another toner image formed on the front surface of the second transparent resin sheet is a mirror image of the toner image on the front surface of the first transparent resin sheet.

10. The method according to claim 8, wherein said another toner image formed on the front surface of the second transparent resin sheet is another solid image formed in an entire image-formable area on the front surface of the second transparent resin sheet.

11. The method according to claim 8,
wherein said another toner image formed on the front surface of the second transparent resin sheet includes a mirror image formed directly on the front surface of the second transparent resin sheet and another solid image formed in an entire image-formable area on the front surface of the second transparent resin sheet so as to cover the mirror image.

12. An image forming apparatus configured to produce an image recording medium, the image forming apparatus comprising:
an image forming device configured to form a toner image on a front surface of a first transparent resin sheet and form a solid image on the toner image on the front surface of the first transparent sheet;
a fixing device configured to apply pressure and heat to the toner image and the solid image on the front surface of the first transparent resin sheet to fix the toner image and the solid image on the front surface of the first transparent resin sheet; and
an adhesion device configured to apply pressure, or pressure and heat to the first transparent resin sheet and a second transparent resin sheet in a state in which the second transparent resin sheet is overlaid on the front surface of the first transparent resin sheet on which the toner image and the solid image are fixed, to bond the first transparent resin sheet and the second transparent resin sheet together with the toner image and the solid image serving as an adhesive,
the adhesion device including at least one of the fixing device and a registration roller pair that feeds the first transparent resin sheet and the second transparent resin sheet to the image forming device.

13. The image forming apparatus of claim 1, wherein the image forming device is further configured to form the toner image, which is a mirror image, directly on the front surface of the first transparent resin sheet and the solid image is formed in an entire image-formable area of the first transparent resin sheet so as to cover the mirror image.

14. An image recording medium, comprising:
a first sheet and a second sheet, each made of resin; and
a first toner image and a second toner image, the first and second toner images being interposed between the first and second sheets and serving as an adhesive to bond the first and second sheets together,
wherein at least one of the first and second sheets has a transparent portion to enable the first and second toner images to be visible through the at least one of the two sheets, and
the first and second toner images are mirror images of one another.

15. The image recording medium of claim 14, wherein the first and second toner images are formed along edges of a surface of the first sheet and a surface of the second sheet.

16. The image recording medium of claim 15, further comprising a third toner image formed on one of the first sheet and the second sheet.

17. The image recording medium of claim 16, wherein the third toner image is formed on an inner part of at least one of the first sheet and the second sheet, in relation to the first and second toner images.

18. The image recording medium according to claim 14, wherein the two sheets are transparent resin sheets.

19. An image forming apparatus configured to produce an image recording medium, the image forming apparatus comprising:
an image forming device configured to form a first toner image on a front surface of a first resin sheet;
a fixing device configured to apply pressure and heat to the first toner image on the front surface of the first resin sheet to fix the first toner image on the front surface of the first resin sheet; and
an adhesion device configured to apply pressure, or pressure and heat, to the first resin sheet and a second resin sheet on which a second toner image is formed in a state in which the second resin sheet is overlaid on the front surface of the first resin sheet on which the first toner image is fixed, to bond the first resin sheet and the second resin sheet together with the first toner image and the second toner image serving as an adhesive,
wherein at least one of the first and second sheets has a transparent portion to enable the first and second toner images to be visible through the at least one of the two sheets, and the first and second toner images are mirror images of one another.

20. A method of producing an image recording medium, the method comprising:
forming a first toner image on a front surface of a first transparent resin sheet;
applying pressure and heat to the first toner image on the front surface of the first resin sheet to fix the first toner image on the front surface of the first resin sheet; and
applying pressure, or pressure and heat, to the first resin sheet and a second resin sheet on which a second toner image is formed in a state in which the second resin sheet is overlaid on the front surface of the first resin sheet on which the first toner image is fixed, to bond the first resin sheet and the second resin sheet together with the first toner image and the second toner image serving as an adhesive,
wherein at least one of the first and second sheets has a transparent portion to enable the first and second toner images to be visible through the at least one of the two sheets, and
the first and second toner images are mirror images of one another.

* * * * *